(12) United States Patent
Okawa et al.

(10) Patent No.: US 8,830,374 B2
(45) Date of Patent: Sep. 9, 2014

(54) IMAGE CAPTURE DEVICE WITH FIRST AND SECOND DETECTING SECTIONS FOR DETECTING FEATURES

(75) Inventors: Keisuke Okawa, Osaka (JP); Takenori Sakai, Osaka (JP); Naomasa Takada, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 465 days.

(21) Appl. No.: 13/142,080

(22) PCT Filed: Dec. 22, 2009

(86) PCT No.: PCT/JP2009/007116
§ 371 (c)(1),
(2), (4) Date: Aug. 19, 2011

(87) PCT Pub. No.: WO2010/073619
PCT Pub. Date: Jul. 1, 2010

(65) Prior Publication Data
US 2011/0298941 A1 Dec. 8, 2011

(30) Foreign Application Priority Data

Dec. 26, 2008 (JP) .................................. 2008-332551

(51) Int. Cl.
*H04N 5/222* (2006.01)
(Continued)

(52) U.S. Cl.
CPC ............ *H04N 5/23293* (2013.01); *G06T 7/003* (2013.01); *G06T 2207/30201* (2013.01); *G06T 2207/10024* (2013.01); *H04N 5/23219* (2013.01); *G06K 9/00234* (2013.01); *H04N 5/23212* (2013.01); *G06T 2207/10016* (2013.01); *H04N 5/232* (2013.01)
USPC ....................... 348/333.02; 348/345; 348/346

(58) Field of Classification Search
USPC .............. 348/77, 78, 333.01–333.03, 333.05, 348/333.11, 345, 346, 349
See application file for complete search history.

(56) References Cited

U.S. PATENT DOCUMENTS 6,035,074 A * 3/2000 Fujimoto et al. .............. 382/282
(Continued)

FOREIGN PATENT DOCUMENTS

EP 1 986 421 A2 10/2008
(Continued)

OTHER PUBLICATIONS

Notice of Reasons for Rejection for corresponding Japanese Application No. 2010-543854 issued on Mar. 5, 2013 and English translation.
(Continued)

*Primary Examiner* — Aung S Moe
*Assistant Examiner* — Euel Cowan
(74) *Attorney, Agent, or Firm* — Renner, Otto, Boisselle & Sklar, LLP

(57) ABSTRACT

The present invention provides a highly flexible shooting environment by letting the user shoot any subject he or she likes.
The image capture device of this invention includes: an image capturing section, which receives light coming from a subject and generates a signal representing an image of the subject; a first detecting section for detecting a feature in the image by a first predetermined method; a second detecting section for detecting a feature in the image by a second method, which is different from the first method; an interface section for accepting an operation specifying a position on the image; and a controller for determining, according to a relationship between a location of the feature detected by the first detecting section and the position specified for the interface section at a point in time when the interface section accepts the operation, which of the first and second detecting sections should be used to detect a feature in a forthcoming image to be generated from that point in time on.

11 Claims, 9 Drawing Sheets

(51) Int. Cl.
*G03B 13/00* (2006.01)
*G06T 7/00* (2006.01)
*H04N 5/232* (2006.01)
*G06K 9/00* (2006.01)

(56) References Cited

U.S. PATENT DOCUMENTS

| | | | |
|---|---|---|---|
| 6,118,484 A | | 9/2000 | Yokota et al. |
| 7,034,881 B1 * | | 4/2006 | Hyodo et al. ............ 348/333.12 |
| 2003/0142209 A1 * | | 7/2003 | Yamazaki et al. ............ 348/143 |
| 2005/0088538 A1 | | 4/2005 | Nozaki et al. |
| 2008/0068456 A1 | | 3/2008 | Fujii et al. |
| 2008/0260375 A1 | | 10/2008 | Yumiki |
| 2008/0317285 A1 | | 12/2008 | Abe |
| 2009/0041445 A1 * | | 2/2009 | Yoshida et al. ............ 396/121 |
| 2010/0066847 A1 | | 3/2010 | Suzuki et al. |

FOREIGN PATENT DOCUMENTS

| | | | |
|---|---|---|---|
| JP | 5-328197 A | | 12/1993 |
| JP | 11-136568 A | | 5/1999 |
| JP | 2002-369215 A | | 12/2002 |
| JP | 2005-117530 A | | 4/2005 |
| JP | 2007-279601 | * | 10/2007 |
| JP | 2008-182662 A | | 8/2008 |
| JP | 2008-206018 A | | 9/2008 |
| JP | 2008-271132 A | | 11/2008 |
| JP | 2008-301355 | | 12/2008 |
| JP | 2008-311817 A | | 12/2008 |

OTHER PUBLICATIONS

Supplementary European Search Report for corresponding European Application No. EP 09 83 4427 dated Jun. 18, 2012.

International Search Report for corresponding International Application No. PCT/JP2009/007116 mailed Feb. 2, 2010.

Form PCT/ISA/237 for corresponding International Application No. PCT/JP2009/007116 dated Feb. 2, 2010.

* cited by examiner (a)

100a (b)

100b

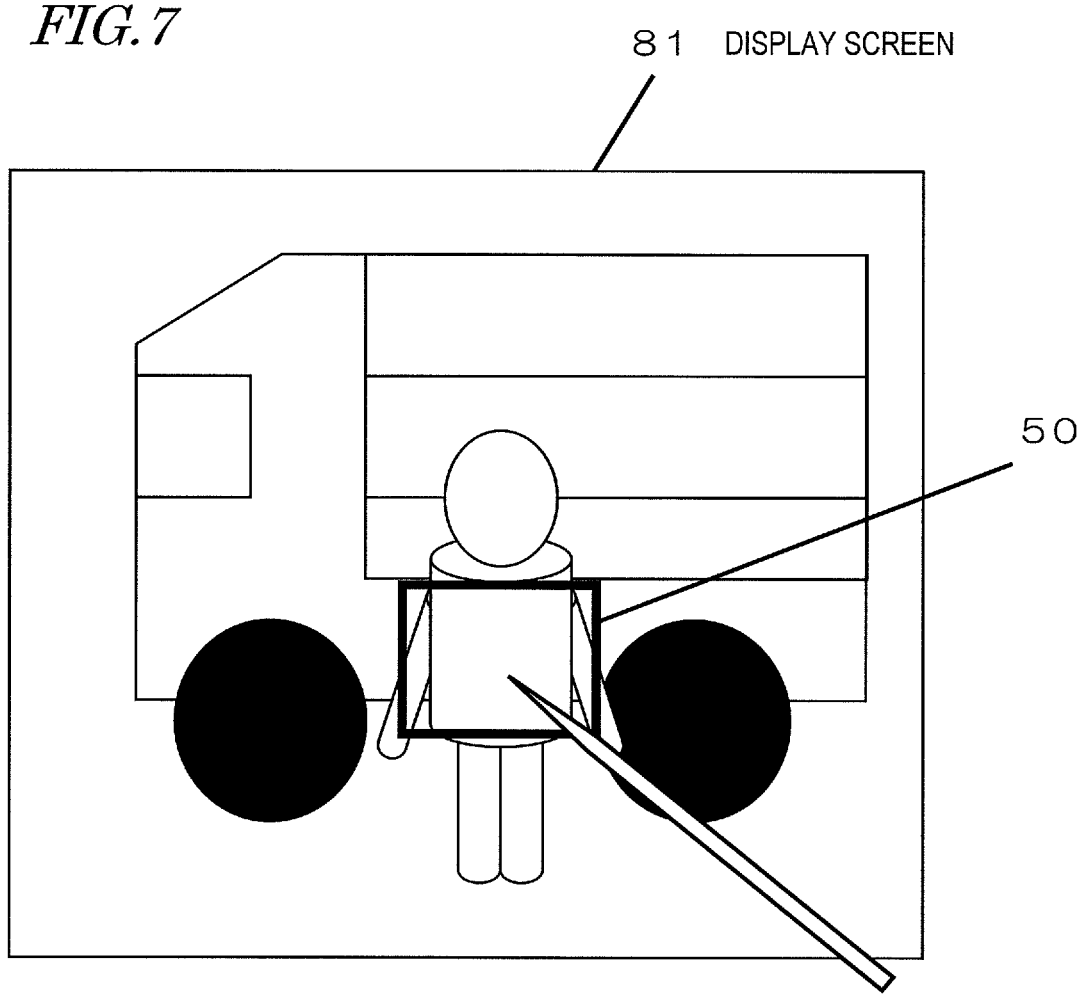

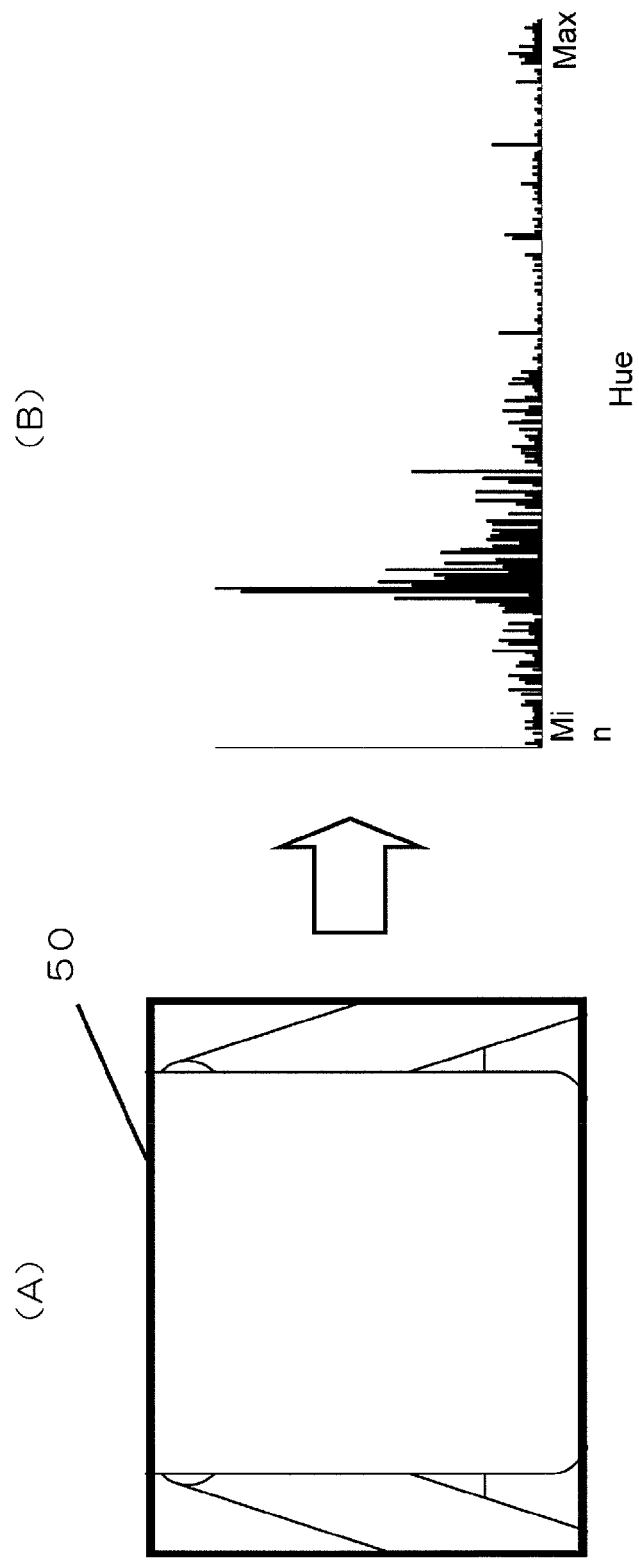

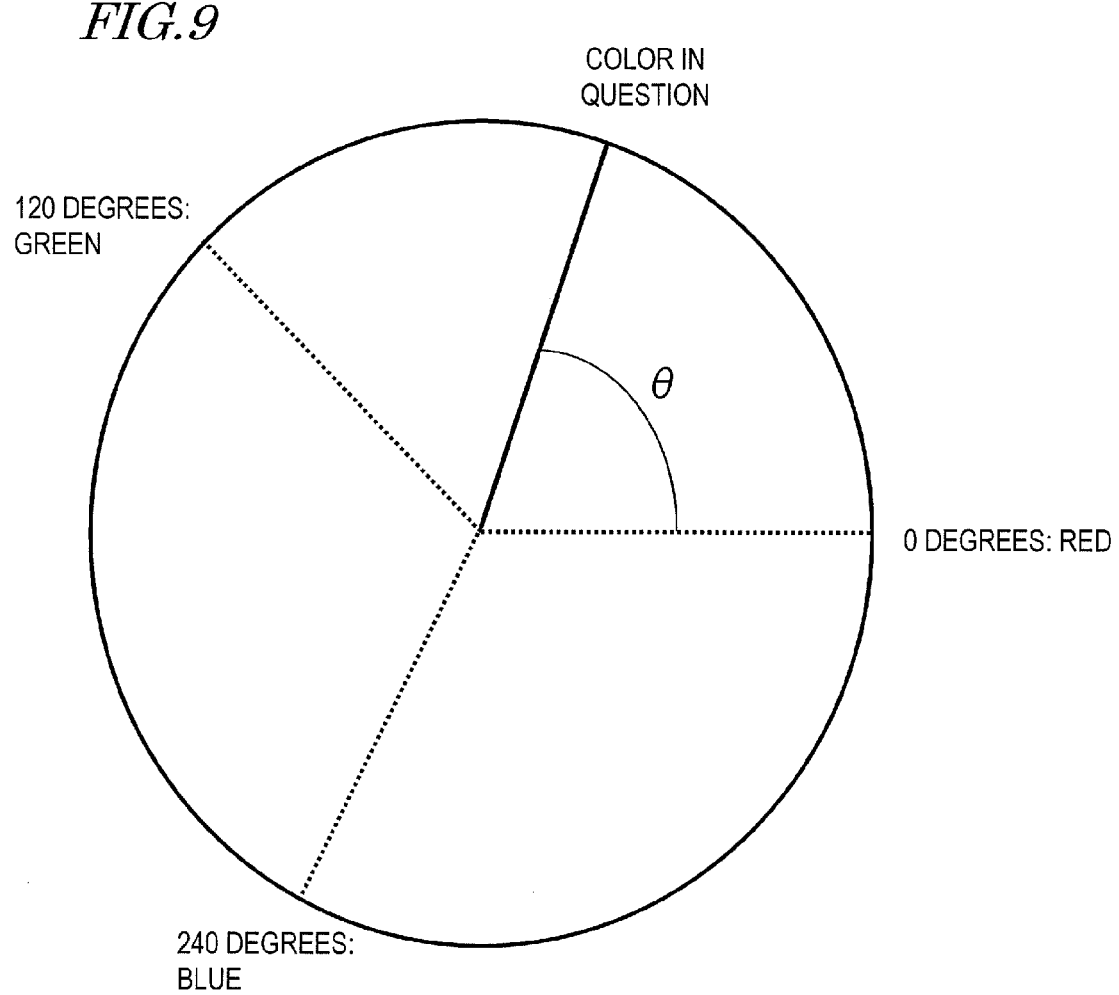

IMAGE CAPTURE DEVICE WITH FIRST AND SECOND DETECTING SECTIONS FOR DETECTING FEATURES

TECHNICAL FIELD

The present invention relates to a technique for making an image capture device recognize a subject.

BACKGROUND ART

Some conventional image capture devices (such as digital cameras) have the function of recognizing a subject. Such an image capture device can recognize the subject by performing various kinds of controls, including automatic exposure (AE) and autofocusing (AF), continuously, thereby enabling the user to shoot the subject on the best condition.

Patent Document No. 1 discloses an image capture device with a monitor screen to display a subject image. If there are multiple subjects on the same screen, this image capture device allows the user to choose one of the subjects he or she wants to shoot. As a result, the best AE and AF controls can be done on that chosen subject.

Specifically, the image capture device disclosed in Patent Document No. 1 includes area setting means 3 for setting an area on the screen using an image signal that has been supplied from an image sensor 2, line-of-sight sensing means 8, 9, 11 for sensing the shooter's line of sight, and area choosing means 12 for choosing, if multiple areas have been set by the area setting means, a targeted one of the areas in accordance with the line-of-sight information provided by the line-of-sight sensing means. If multiple areas have been set on the screen, this image capture device chooses automatically the targeted one of those areas in accordance with the line-of-sight information.

CITATION LIST

Patent Literature

Patent Document No. 1: Japanese Patent Application Laid-Open Publication No. 5-328197

SUMMARY OF INVENTION

Technical Problem

However, the image capture device disclosed in Patent Document No. 1 cannot sense the user's target area perfectly accurately but there is a certain limit to its sensing ability. And Patent Document No. 1 discloses nothing in particular on how to increase that sensing ability.

It is therefore an object of the present invention to provide an image capture device that can sense the shooter's target subject even more accurately.

Solution to Problem

An image capture device according to the present invention includes: an image capturing section, which receives light that has come from a subject and which generates a signal representing an image of the subject; a first detecting section for detecting a feature in the generated image by a first predetermined method; a second detecting section for detecting a feature in the generated image by a second method, which is different from the first method; an interface section for accepting an operation that specifies a position on the generated image; and a controller for determining, according to a relationship between a location of the feature detected by the first detecting section and the position specified for the interface section at a point in time when the interface section accepts the operation, which of the first and second detecting sections should be used to detect a feature in a forthcoming image to be generated from that point in time on.

The image capture device may further include a display section for displaying the image that has been generated by the image capturing section and the location of the feature that has been detected by the first detecting section while the feature in the image is being detected by the first detecting section.

The first detecting section may detect the feature in the generated image using a predefined pattern, and the second detecting section may detect the feature in the generated image by reference to the position specified for the interface section and color information of the generated image.

The first detecting section may detect the feature in the generated image by using a pattern representing at least one of the shapes and relative arrangement of multiple parts that form a human face.

While the first feature detecting section locates the feature, the controller may determine whether or not the position specified for the interface section is inside of an area from which the feature has been detected. If the position is inside of the feature detected area, the controller may instruct the display section to display a recognizable indicator at the location of the feature detected.

While the first feature detecting section locates the feature, the controller may determine whether or not the position specified for the interface section is inside of an area from which the feature has been detected. If the position is outside of the area, the controller may determine that the feature in the image be detected by the second detecting section, may instruct the second detecting section to detect the image feature by reference to the position and color information of the image, and may instruct the display section to display a recognizable indicator at the location of the image feature detected by the second detecting section.

If the position that has been inside of the feature detected area is now outside of that area, the controller may determine that the feature in the image be detected by the second detecting section, may instruct the second detecting section to detect the image feature by reference to the position and color information of the image, and may instruct the display section to display a recognizable indicator at the location of the image feature detected by the second detecting section.

If the position that has been outside of the feature detected area is now inside of that area, the controller may instruct the display section to display a recognizable indicator at the location of the feature detected by the first detecting section.

At least two of the first detecting section, second detecting sections, and the controller may be integrated together on a single chip circuit.

Advantageous Effects of Invention

An image capture device according to the present invention includes first and second feature detecting sections for detecting features in a generated image by mutually different methods. And according to a relationship between a location of the feature detected by the first detecting section and the position specified for the interface section at a point in time when the interface section accepts an operation that specifies that position, the image capture device determines which of the first and second feature detecting sections should be used to detect a feature in a forthcoming image to be generated from that point in time on. By using such first and second feature detecting sections selectively, the image capture device of the present invention can sense the shooter's target subject more accurately.

BRIEF DESCRIPTION OF DRAWINGS

FIG. 7 illustrates how an indicator 50 is set to define an auto-tracking area.

FIG. 8 shows the color information of the image data in the auto-tracking area.

FIG. 9 shows a hue space.

DESCRIPTION OF EMBODIMENTS

Hereinafter, preferred embodiments of an image capture device according to the present invention will be described with reference to the accompanying drawings.

1. Configuration for Image Capture Device

Figure 1:
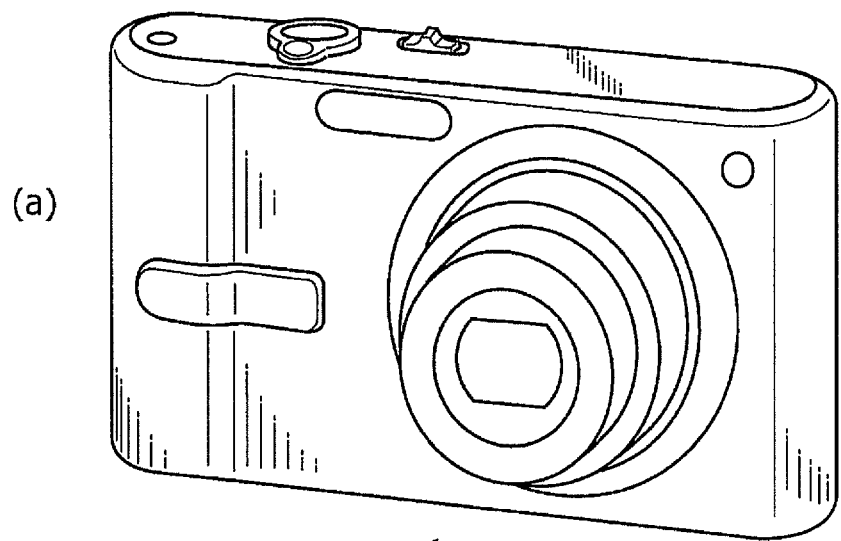
FIGS. 1(a) and 1(b) illustrate the appearances of a digital still camera 100a and a camcorder 100b, which are two typical image capture devices.
Figure 1:
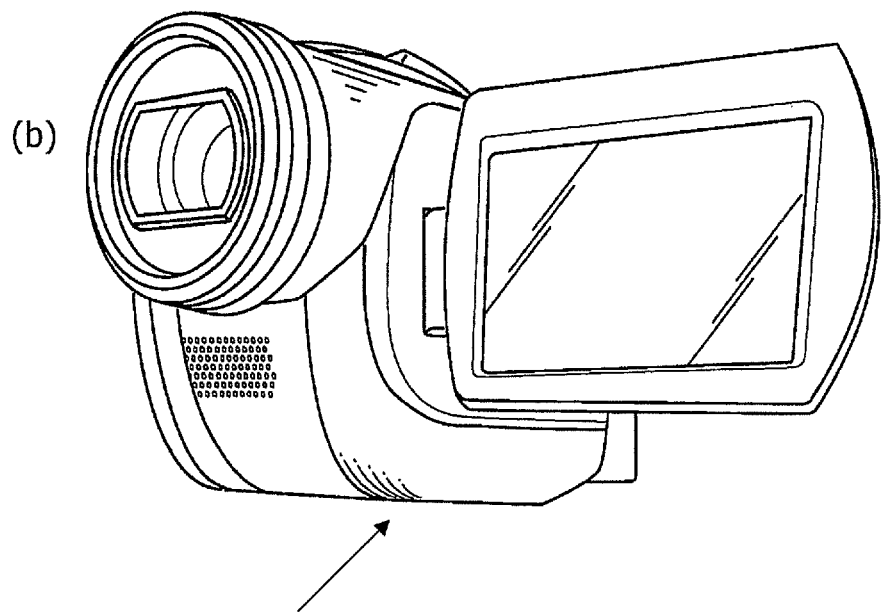

FIGS. 1(a) and 1(b) illustrate the appearances of a digital still camera 100a and a camcorder 100b, which are two typical image capture devices. The digital still camera 100a is used mostly to capture a still picture but has a moving picture shooting capability, too. On the other hand, the camcorder 100b is used to shoot a moving picture most of the time.

Figure 2:
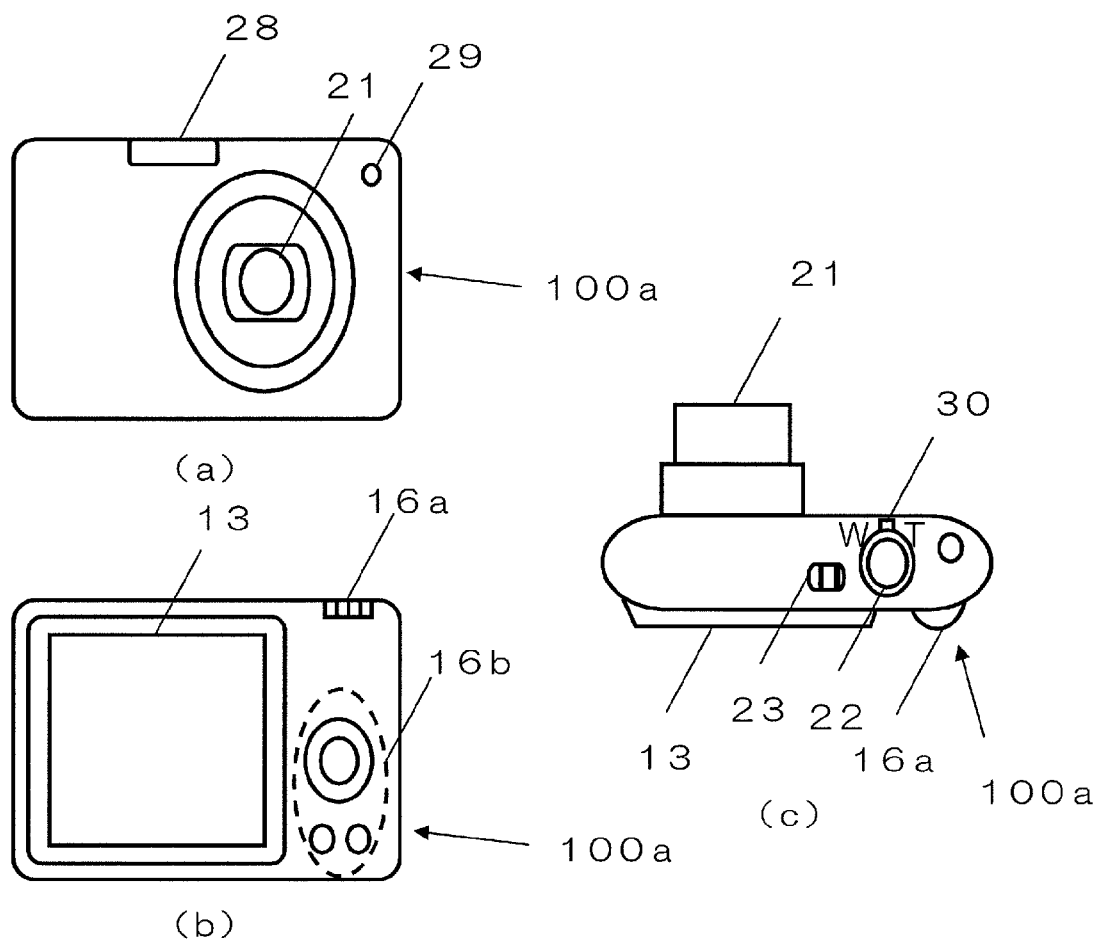
FIGS. 2(a), 2(b) and 2(c) are respectively a front view, a rear view and a top view illustrating the appearance of a digital still camera 100a as a preferred embodiment of the present invention.

FIGS. 2(a), 2(b) and 2(c) are respectively a front view, a rear view and a top view illustrating the appearance of a digital still camera 100a as a preferred embodiment of the present invention.

On the front side of the digital still camera 100a, arranged are a lens barrel 21, a flash 28 and an AF assist lamp 29 that activates the AF function in a dark place as shown in FIG. 2(a).

On the other hand, on the rear side of the digital still camera 100a, arranged are a display device 13, a dial 16a for use to choose a shooting mode, and a number of operating buttons 16b as shown in FIG. 2(b).

Furthermore, at the top of this digital still camera 100a, arranged are a shutter release button 22, a power switch 22, and a zoom lever 30 for changing the angle of view as shown in FIG. 2(c).

The camcorder 100b also has buttons with similar functions and has similar capabilities except the lens barrel and the flash, but the description thereof will be omitted herein.

In this description, such a digital still camera 100a and such a camcorder 100b will be collectively referred to herein as "image capture devices 100".

Figure 3:
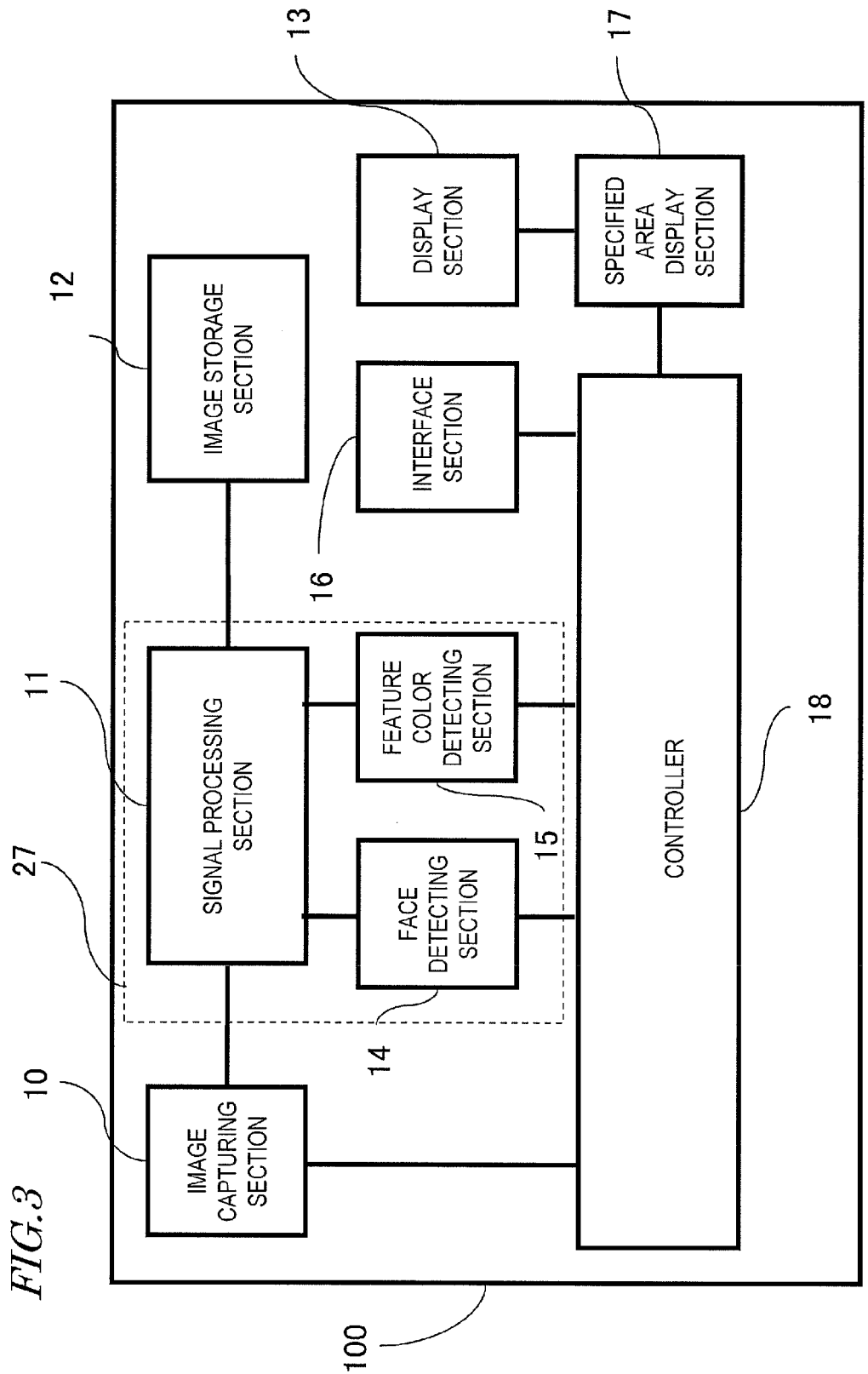
FIG. 3 is a block diagram illustrating a configuration for an image capture device 100 with a subject recognition capability according to a preferred embodiment of the present invention.

FIG. 3 is a block diagram illustrating a configuration for an image capture device 100 with a subject recognition capability according to a preferred embodiment of the present invention.

The image capture device 100 includes an image capturing section 10, a signal processing section 11, an image storage section 12, a display section 13, a face detecting section 14, a feature color detecting section 15, an interface section 16, a specified area display section 17 and a controller 18. Hereinafter, these components of the image capture device 100 will be described in detail one by one. However, the hardware configurations of those components to describe are not illustrated because they are already known to everybody in the art.

The image capturing section 10 receives the light that has come from the subject and generates an image signal representing the subject image. The image capturing section 10 includes an optical system and an image sensor. The optical system may include an objective lens, a zoom lens, a diaphragm, an OIS (optical image stabilizer) unit, and a focus lens (none of which are shown in FIG. 3). The optical system receives and condenses the light that has come from the subject, thereby producing a subject image. The image sensor captures the subject image that has been produced by the optical system and generates an analog signal representing the subject image. The image sensor may be a CMOS image sensor or a CCD image sensor, for example.

The signal processing section 11 receives the analog image signal that has been generated by the image capturing section 10 and performs predetermined kinds of processing on it. The signal processing section 11 is implemented as a single chip circuit and may include an A/D converter, an image processing section, a system encoder and a system decoder (none of which are shown in FIG. 3). The A/D converter converts the analog image signal that has been generated by the image sensor into a digital signal. The image processing section subjects the digital image signal that has gone through the conversion by the A/D converter to various kinds of image processing, and also generates image data to be supplied to the system encoder and image data to be displayed on the display section 13. Furthermore, the image processing section also subjects the digital image signal, which has been processed and output by the system decoder, to image processing, thereby generating image data to be displayed on the display section 13 and image data to be fed back to the system encoder.

The image processing section in the signal processing section 11 includes an image preprocessing section, an image compressing section and an image expanding section (none of which are shown in FIG. 3). The image preprocessing section subjects the digital image signal that has been converted by the A/D converter to gamma correction, white balance correction, and various other kinds of image processing. The image compressing section compresses the image data by performing DCT (discrete cosine transform), Huffman coding, or any other appropriate transform. The image compressing section compresses the image data in a format compliant with the MPEG-2 standard or the H.264 standard, for example. However, these compression standards are just examples and any other arbitrary compression format may be adopted as well. Or the compression between images could even be omitted. The image expanding section decompresses and decodes the image data. This processing is performed when the compressed image data that has been output from the system decoder of the signal processing section 11 needs to be displayed on the display section 13. The system decoder decodes the AV data that has been stored in the image storage section 12, thereby generating compressed image data and outputting it to the image expanding section.

The image storage section 12 stores the image data supplied from the signal processing section 11, and includes a storage medium and a media controller for controlling writing on the storage medium. Examples of the storage medium include a flash memory card, a hard disk, a DVD (digital versatile disc) and a BD (Blu-ray Disc). The storage medium may be either attachable and removable to/from the image capture device 100 or built in the image capture device 100.

The display section 13 is a display device such as an LCD monitor or an electronic viewfinder, and may display the image data that has been captured by the image capturing section 10 and the image data included in the AV data that has been retrieved from the image storage section 12. The display section 13 can also display various sorts of setting information of the image capture device 100 and running time of shooting. Furthermore, the display section 13 displays the image that has been output from the signal processing section 11 and a particular object detected. While a feature in the image (such as a person's face) is being detected by the face detecting section 14 to be described later, the display section 13 displays the image that has been generated by the image capturing section 10 and the location of the feature that has been detected by the face detecting section 14.

The face detecting section 14 detects a person's face on the output image of the signal processing section 11 by a predetermined detecting method. More specifically, the face detecting section 14 analyzes the image data that has been generated by the signal processing section 11 and locates a portion of the image that has a predetermined pattern, which has been defined in advance as what represents the characteristic shapes and/or arrangement of multiple parts (such as eyes, nose and mouth) that form a person's face. And the face detecting section 14 recognizes a portion with such a pattern as a person's face. By performing such processing continuously, the face detecting section 14 can keep detecting the subject person's face unless some significant change arises in him or her (e.g., unless that person turns his or her face away). Also, the face detecting section 14 not only detects the location and size of the face but also calculates the degree of reliability indicating with how much certainty a particular face has been recognized.

The feature color detecting section 15 detects a particular subject by reference to a specified position and the color information of an area that is defined around the specified position on the signal processed image. As used herein, the "subject" refers to not only a person but also any arbitrary object (which may be a liquid or a gas as well as a solid and) which is included in the image. Also, even a person, who has been shot from such an angle at which it is difficult to detect his or her face features, can also be a subject. The operation of the feature color detecting section 151 will be described in further detail later.

The feature color detecting section 15 receives the image data generated from the signal processing section 11 and position information from the interface section 16, respectively, crops a particular area from the image data in accordance with the information about the specified position, and detects a particular subject based on the color information of that area. That is to say, the feature color detecting section 15 detects a color in the image as the subject's feature. It is clear that this method is totally different from what is adopted by the face detecting section 14 to detect a person's face by using a pattern characteristic of a human face.

The interface section 16 accepts the user's operation that specifies a particular position on the image being displayed on the display section 13 and various other operations. The interface section 16 may be hardware keys that are arranged in the pattern shown in FIG. 2(b) or in a cross pattern or may even be a touchscreen. If the interface section 16 is implemented as hardware keys, the user moves either a cursor or indicator (or frame) that is superimposed on the image being presented on the display section 13 by tapping the hardware keys, thereby specifying a position on the image. On the other hand, if the interface section 16 is implemented as a touchscreen, then the user presses the touchscreen that is laminated on the display device of the display section 13, thereby specifying a position on the image. In any case, the interface section 16 relays the information about the specified position (which will be referred to herein as "position information") to the controller 18. Furthermore, the interface section 16 accepts not just the position specified but also various other operations given by the user and passes those operations to the controller 18.

The specified area display section 17 displays the specified area, and receives the position information of the areas that have been detected by the face detecting section and the feature color detecting section 15 and the information about the position specified by the shooter (i.e., user) by way of the controller 18. Then, the specified area display section 17 generates an indicator signal representing some pointer (such as an indicator) that clearly points out the position specified by that position information. Then, the indicator signal is sent to the display section 13 that is presenting the image data and that pointer is displayed on the display section 13.

The controller 18 controls the entire image capture device 100 and may be implemented as a circuit including a semiconductor device such as a microcomputer, for example. The controller 18 may consist of either hardware components only or a combination of hardware and software as well. According to this preferred embodiment, a microcomputer executes a computer program that describes the processing, of which the procedure is defined by the flowchart shown in FIG. 6 (to be described later). That is to say, either the microcomputer itself or respective components that operate under the control of the microcomputer perform the respective processing steps that are defined by that flowchart.

For example, the controller 18 senses a relationship between a location of the feature of the person's face detected by the face detecting section 14 and the position specified on the image for the interface section 16 at a point in time when the interface section 16 accepts the user's operation that specifies the position on the image. And based on the result of that sensing, the controller 18 determines whether the face detecting section 14 or the feature color detecting section 15 should be used to detect a feature in a forthcoming image to be generated from that point in time on. This processing step will be described in further detail later.

Such a computer program may be circulated on the market by being stored on a storage medium such as a CD-ROM or downloaded over telecommunications lines such as the Internet. The controller 18 may be implemented as a general-purpose microcomputer that executes the computer program. Or the controller 18 may also be a dedicated processor in which such a computer program has been pre-installed in a microprocessor.

In the preferred embodiment described above, the face detecting section 14 and the feature color detecting section 15 are supposed to be provided separately from the signal processing section 11 and the controller 18. However, this is only an example. Alternatively, every function of the signal processing section 11, the face detecting section 14, the feature color detecting section 15 and the controller 18 may be performed by a single chip circuit. Still alternatively, the signal processing section 11, the face detecting section 14, and the feature color detecting section 15 may be implemented by a single chip circuit 27 and the controller may be implemented as a separate microcomputer as shown in FIG. 3. Or the functions of the face detecting section 14, the feature color detecting section 15 and the controller 18 may be performed by a single chip circuit. Yet another option is making a single chip perform the functions of any two of these functional blocks (e.g., the signal processing section 11 and the face detecting section 14, or the signal processing section 11 and the feature color detecting section 15, or the face detecting section 14 and the feature color detecting section 15, or the controller 18 and the face detecting section 14, or the controller 18 and the feature color detecting section 15, or the signal processing section 11 and the controller 18).

2. Operation

Hereinafter, it will be described exactly how the image capture device 100 with such a configuration performs the subject recognition function.

The signal processing section 11 subjects the image data that has been supplied from the image capturing section 10 to various kinds of corrections. The corrected signals will then be stored in the image storage section 12. Also, the signal processing section 11 generates a signal to detect a particular object. The face detecting section 14 detects a face in the signal supplied from the signal processing section 11. The face may be detected by any of various known face recognition methods. For example, the face may be detected by sensing either the skin color or the shapes and arrangement of multiple facial parts (including eyes, nose and mouth). According to this preferred embodiment, any method may be adopted as long as the face may be detected in the given image data. The controller 18 instructs the specified area display section 17 to display either the specified area detected or an indicator indicating the area's location on the display section 13.

In the meantime, the controller 18 monitors the interface section 16 to see if the user has specified any subject on the display section 13. The subject may be specified by entering position information. When provided with the position information, the controller 18 determines whether or not the position specified by that position information is inside of the area of any particular object that has already been detected. If the position is inside of any particular object detected area, the controller 18 extracts that area including the selected position.

On the other hand, if the subject's position specified by the position information cannot be found in any particular object detected area, then the controller 18 input the specified position into the feature color detecting section 15. In response, the feature color detecting section 15 newly extracts another particular object based on the signal supplied from the signal processing section 11 and the specified position information. It is usually difficult to specify a particular object in an image with only color information. That is why by reference to the specified position information, the feature color detecting section 15 extracts an object in almost the same color from around the specified position, thereby extracting a particular object.

The controller 18 controls the image capturing section 10, the signal processing section 11 and other sections so that the AF and AE are optimized on the area extracted.

Hereinafter, it will be described with reference to FIGS. 4 and 5 how this image capture device 100 operates if the user has specified a subject that has not been detected by the face detecting section 14.

Figure 4:
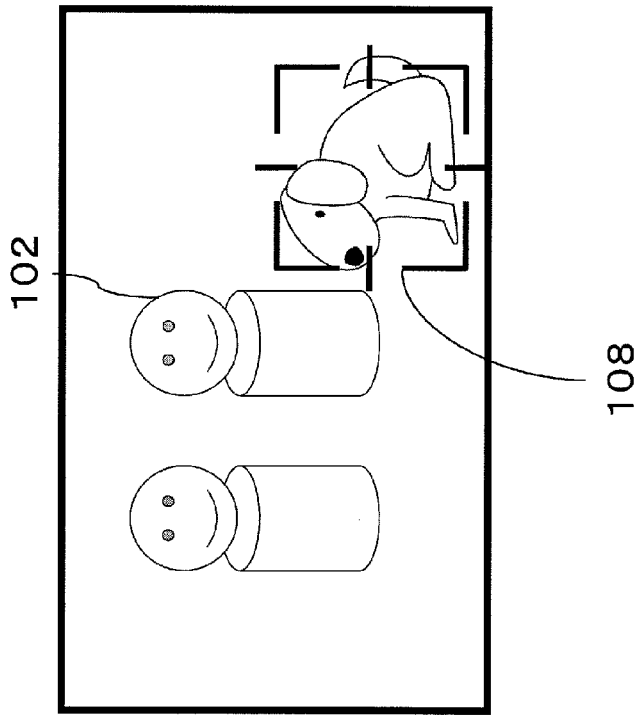
FIGS. 4(a) and 4(b) illustrate examples of images presented on the display section 13.
Figure 4:
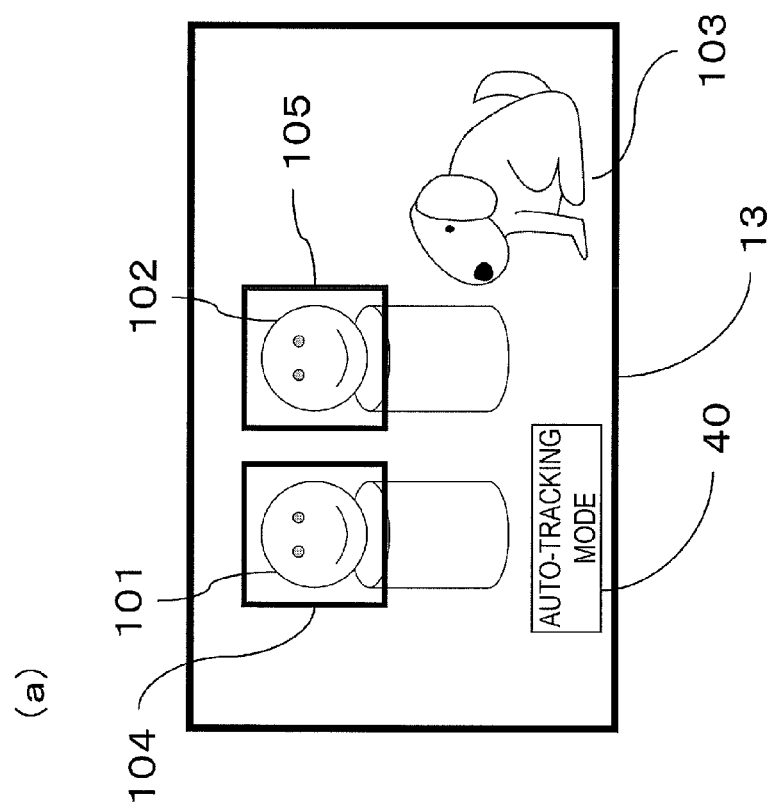
Figure 5:
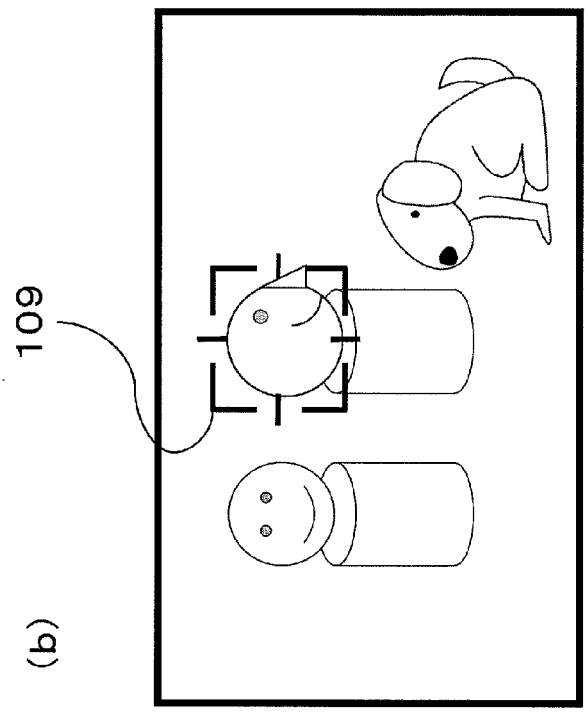
FIGS. 5(a) and 5(b) illustrate examples of images presented on the display section 13.
Figure 5:
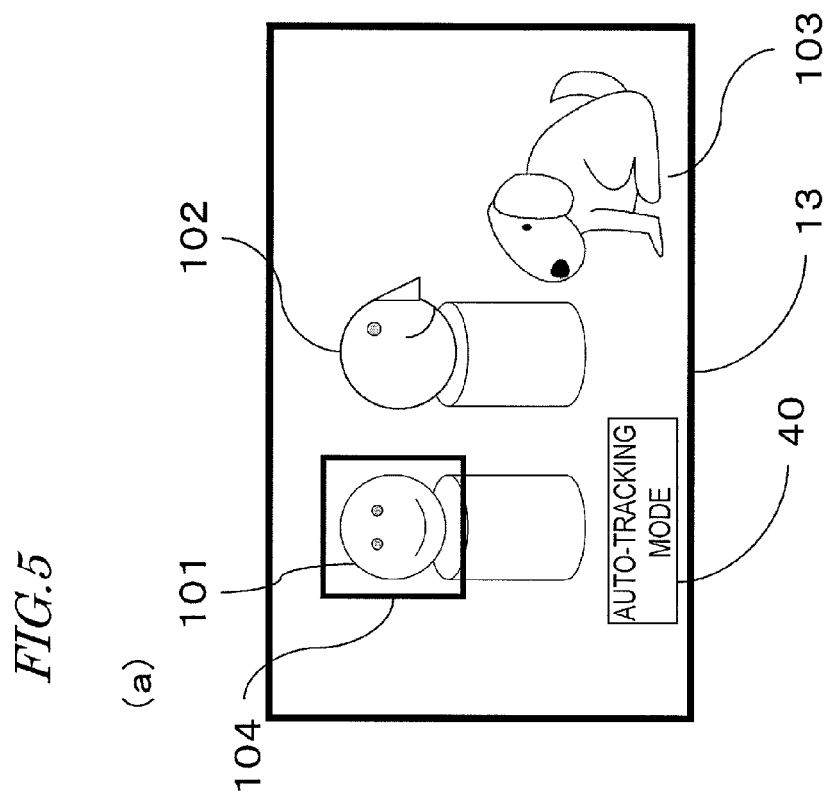

FIGS. 4 and 5 illustrate examples of images presented on the display section 13.

In FIG. 4(a), suppose the faces of subjects 101 and 102 have already been detected by the face detecting section 14. Thus, indicators 104 and 105, indicating that those faces have already been detected, are displayed in FIG. 4(a).

Suppose the user wants to shoot another subject 103 in such a situation. In that case, first of all, the user needs to choose the icon 40 that says "auto-tracking mode". In response, the controller 18 instructs the specified area display section 17 to erase the indicators 104 and 105 from the screen.

The user can choose the subject 103 by either pressing the ENTER button (not shown) of the interface section 16 or touching a designated area on the screen. In this manner, any position on the subject 103 can be specified. Once the position has been specified in this manner, the feature color detecting section 15 finds a range in approximately the same color as the specified position and notifies the controller 18 of that range. When provided with information about such a range in almost the same color, the controller 18 instructs the specified area display section 17 to generate a signal that will display another indicator 108 in that range of almost the same color.

Next, the feature color detecting section 15 obtains the color information of pixels that fall within that range in almost the same color as the specified position, and extracts a distribution of colors falling within a predetermined range by reference to the color of a pixel that is located around the center of that range. That is to say, an area including the subject 103 is extracted. Then, the specified area display section 17 determines that area to be the indicator 108 to display. The method of detecting the range in almost the same color will be described in detail later.

On the other hand, FIGS. 5(a) and 5(b) illustrate how to specify a subject 102 to shoot in a situation where the subject 102 is a person's face but cannot be detected by the face detecting section 14 due to his or her status. In this case, the user wants to shoot the subject 102 but the face detecting section 14 may be unable to detect the subject 102 depending on his or her status.

For example, if he or she is facing sideways as shown in FIG. 5(a) or facing backward, then the face detecting section 14 cannot detect eyes and other parts that form his or her face, and therefore, will fail to detect the subject 102.

However, according to this preferred embodiment, the user can specify any arbitrary position on the image by selecting the icon 40. That is why if the user specifies a position by designating approximately the center of the subject 102, the specified area display section 17 displays an indicator 109.

The feature color detecting section 15 extracts an area including the subject 102 and determines that area as the indicator 109 to display.

As described above, by using the feature color detecting section 15, the controller 18 can also detect even an animal, a car or any other object that cannot be detected by the face detecting section 14, and can designate it as a specified object.

Figure 6:
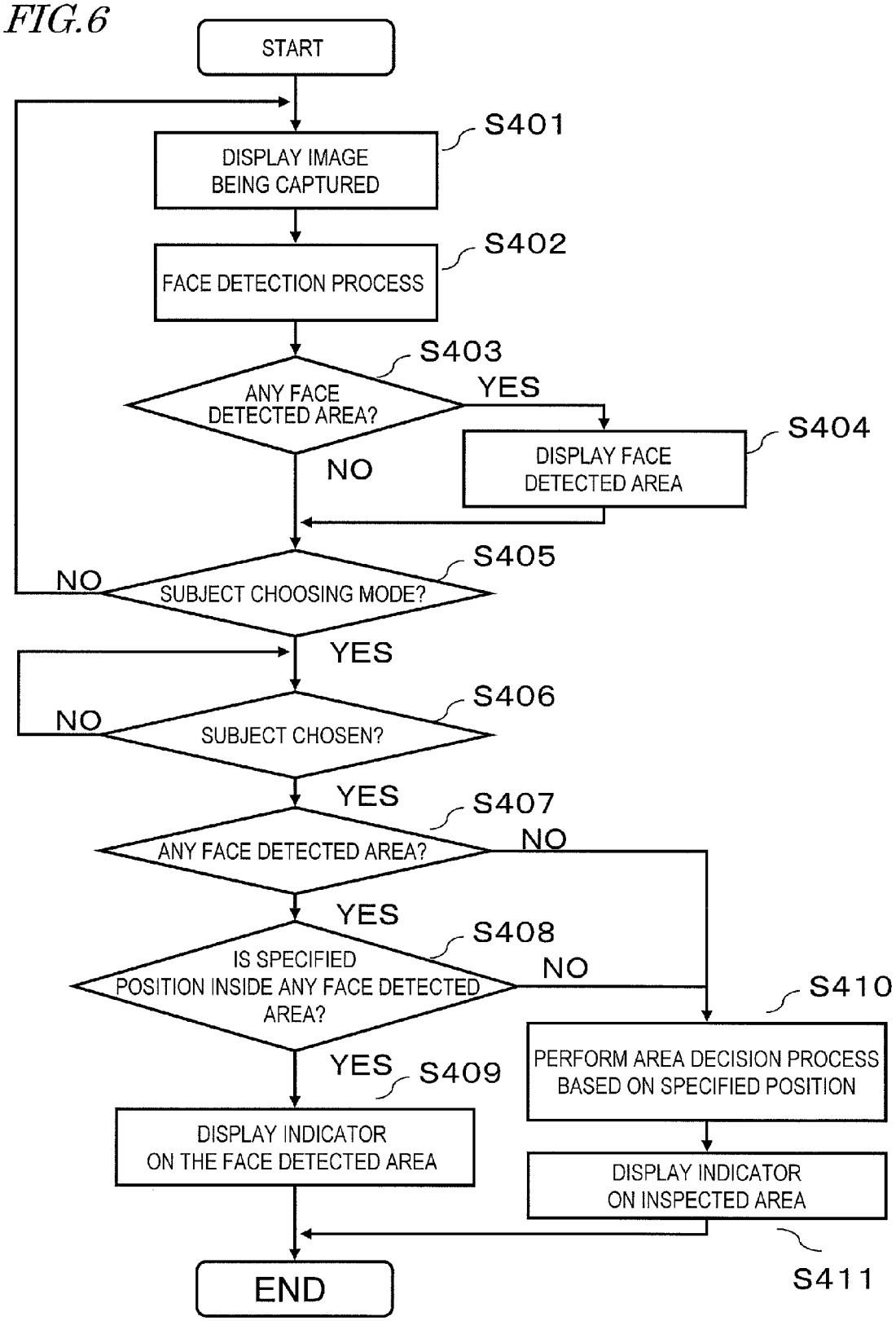
FIG. 6 is a flowchart showing how this image capture device 100 operates when specifying the subject to shoot.

FIG. 6 is a flowchart showing how this image capture device 100 operates when specifying the subject to shoot.

First of all, the image capture device 100 displays, on the display section 13, an image being captured by the image capturing section 10 in Step S401. Next, in Step S402, the face detecting section 14 analyzes the image data that has been generated by the signal processing section 11, thereby detecting a person's face in the image data. If there is any face detected area (i.e., if the answer to the query of the processing step S403 is YES), then the controller 18 instructs the specified area display section 17 to display an indicator indicating the face detected on the display section 13 so that the indicator is superimposed on the image data being captured (in Step S404).

Next, in Step S405, the controller 18 determines whether or not the modes of operation of the image capture device 100 have been changed into a mode in which the user is allowed to choose any subject displayed on the display section 13 (which will be referred to herein as a "subject choosing mode"). If the modes of operation of the image capture device 100 have been changed into the subject choosing mode (i.e., if the answer to the query of this processing step S405 is YES), the user is now allowed to choose any subject he or she likes. On the other hand, if the image capture device 100 has not been switched into the subject choosing mode yet (i.e., if the answer to the query of this processing step S405 is NO), then the device waits for the user to change the modes into the subject choosing mode.

Subsequently, in Step S406, the controller 18 determines whether or not the user has taken any action of choosing his or her subject to recognize on the image being presented on the display section 13. In this case, if the display section 13 is implemented as a touchscreen panel, the user can chose his or her subject by putting his or her finger on the subject image being presented on the display section 13. Otherwise, the user taps the cross keys or manipulates any other input device of the interface section 16 to move the pointer on the display section 13 and then presses the ENTER button of the interface section 16 when the pointer points right to the subject to shoot, thereby specifying the subject.

If the user has not taken any action of choosing his or her subject (i.e., if the answer to the query of the processing step S406 is NO), then the controller 18 waits for the user to take that action. On the other hand, if he or she has already taken that action (i.e., if the answer to the query of the processing step S406 is YES), then the controller 18 determines in Step S407 whether or not there is any area in which a face has already been detected by the face detecting section 15.

If there is no area in which any face has already been detected by the face detecting section 15 (i.e., if the answer to the query of the processing step S407 is NO), the controller 18 enters the specified position into the feature color detecting section 15 to make the feature color detecting section 15 perform an area decision process in Step S410. On the other hand, if there is any area in which a face has already been detected by the face detecting section 15 (i.e., if the answer to the query of the processing step S407 is YES), then the controller 18 determines in Step S408 whether or not the specified position is inside of at least one face detected area.

If the specified position is not included in any face detected area (i.e., if the answer to the query of the processing step S408 is NO), then the controller 18 enters the specified position into the feature color detecting section 15 to make the feature color detecting section 15 perform an area decision process in Step S410. On the other hand, if the specified position is included in any face detected area (i.e., if the answer to the query of the processing step S408 is YES), then the controller 18 instructs the specified area display section 17 to display an indicator, indicating that a face detected area including the specified position is now chosen, on the display section 13 (in Step S409). Likewise, even if the feature color detecting section 15 has performed the feature color detection process in Step S410, the controller 18 also instructs the specified area display section 17 to display an indicator, surrounding the feature color in the inspected area, on the display section 13 (in Step S411). In this processing step S411, however, the indicator indicating the specified area needs to be displayed differently from the indicator indicating the area that has been detected by the face detecting section 14 in Step S404. Specifically, the indicator indicating the specified area may be displayed either in a different shape from the indicators indicating the face detected areas as shown in FIGS. 4 and 5 or in the same shape of a different color.

Next, it will be described exactly how the feature color detecting section 15 performs the area decision process in Step S410.

FIG. 7 illustrates a subject on which an indicator 50 has already been set. The feature color detecting section 15 performs an area decision operation on such a subject on which the indicator 50 has been set on the image data. To get that area decision operation done, the feature color detecting section 15 performs a color memorizing process, a search area defining process and a color information searching process. Hereinafter, it will be described exactly how to get these processes done.

The color memorizing process is a process for storing the color information of the image data inside the indicator 50 on a storage medium. Examples of the storage media include a buffer memory, a flash memory and a memory card (none of which are shown) but any other storage medium may also be used. Optionally, the color information may also be stored in a storage medium that is built in the image storage section 12.

The feature color detecting section 15 obtains the image data inside the indicator 50 as shown in portion (A) of FIG. 8, and then extracts color information from the image data inside the indicator 50. In this case, the color information is represented by the color space of the hue. That is to say, the hue can be represented by a phase angle of 0 through 360 degrees. If the color space is an HSV color space, then the color of a position can be represented by R=0, G=120 and B=240 as shown in FIG. 9. And if the color in question is represented as shown in FIG. 9, that color in question has an angle of $\theta$ degrees. That is why the image data inside the indicator 50 shown in portion (A) of FIG. 8 can be represented by the histogram shown in portion (B) of FIG. 8, of which the abscissa represents the angle (in degrees) and the ordinate represents the number of pixels of each hue inside the range shown in portion (A) of FIG. 8. In this case, the minimum abscissa is 0 degrees, while the maximum abscissa is 359 degrees.

The feature color detecting section 15 stores the color information of the indicator 50 that has been obtained as described above on a storage medium such as a buffer memory, a flash memory or a memory card. It is preferred that color information in the auto-tracking range be stored on a storage medium that is built in the digital camera 1. Then, the color information can be retrieved in a shorter time from the auto-tracking range. Optionally, the hue can also be represented by a color position on the spectrum. In that case, the hue can be represented by setting the wavelength of light within the range of 300 nm to 780 nm.

Specifically, the feature color detecting section 15 detects an area, of which the hue falls within a predetermined range with respect to the hue at the user's specified position (e.g., ±5% with respect to the hue), as the "range in almost the same color". This is the search area defining process. And the feature color detecting section 15 will continue detecting a range having the same color information as the "range in almost the same color" that has been obtained as a result of the search area defining process as the specified area.

The feature color detecting section 15 may find that range either by searching the entire screen but may also find it by searching just a part of the screen.

For example, a number of (e.g., four) partial areas, including the user's specified position and having mutually different sizes, may be defined and that range may be found from one of those partial areas that includes the "range in almost the same color" in a predetermined percentage. More specifically, the largest one of the partial areas, of which 20% through less than 30% is accounted for by the hue in the "range in almost the same color", may be searched to find that range.

The feature color detecting section 15 performs its function as described above.

It should be noted that the timing to perform the processing step S406 (of determining whether or not the user's subject has been chosen) described above is only an example. Optionally, the processing step S406 may also be performed immediately after the image captured has been displayed in Step S401 and before the face detection process is carried out.

Also, if the specified position is included in the face detected area afterward, then the controller 18 may control the operation of the image capture device 100 so that its modes of operation are changed from the color detection process by the feature color detecting section 15 into the face detection process by the face detecting section 14. Conversely, if the face detection process that has been once started cannot be continued anymore because the subject has turned his or her face away, for example, then the controller 18 may control the operation of the image capture device 100 so that its modes of operation are changed into the color detection process by the feature color detecting section 15.

As described above, by letting the user choose any subject he or she likes, not just a person, whose face should be easily detected by the face detecting section 14, but also an animal or a person facing sideways, which would not be detected by the face detecting section 14, can also be chosen. As a result, any subject can be chosen with a lot more flexibility. That is to say, the user can specify any subject he or she likes.

Furthermore, the area to be detected by the face detecting section 14, which is often chosen normally, may have its selection determined quickly by keeping the face detecting section 14 always ON. On the other hand, although it takes a while for the feature color detecting section 14 to determine its selection because it is not until the area has been specified that the detecting section 14 starts detecting that area, the feature color detecting section 14 does not have to be always activated. As a result, the processing load on the image capture device 100 can be lightened.

In the second preferred embodiment of the present invention described above, a feature color detecting section 15 for detecting a particular subject by reference to color information at the specified position has been described as the second feature detecting section. However, this processing is only an example. Alternatively, the motion of the subject at the specified position may be detected and the subject may be detected and tracked based on the magnitude and direction of that motion (which is represented by a so-called "motion vector"). Still alternatively, information about the brightness (or luminance) of the subject at the specified position may be extracted from a digital signal and the subject may be detected and tracked based on that information.

INDUSTRIAL APPLICABILITY

The image capture device of the present invention uses a method that is also applicable to an arbitrary subject, not just a particular subject that has been detected in advance, thereby optimizing AE and AF for the user's chosen subject. Therefore, the present invention is effectively applicable to digital cameras, camcorders and other image capture devices.

REFERENCE SIGNS LIST

10 image capturing section
11 signal processing section
12 image storage section
13 display section
14 face detecting section
15 feature color detecting section
16 interface section
17 specified area display section
18 controller
100 image capture device

The invention claimed is:

1. An image capture device comprising:
    an image capturing section, which receives light that has come from a subject and which generates an image of the subject;
    a first detecting section for detecting a feature in the generated image by a first method;
    a second detecting section for detecting a feature in the generated image by a second method, which is different from the first method;
    an interface section for accepting a user operation that specifies a position on the generated image; and
    a controller for:
        (i) determining a relationship between a position on the generated image of the feature detected by the first detecting section and the position specified by the user operation at a point in time when the interface section accepts the user operation, and
        (ii) based on the relationship between the position of the feature detected by the first detecting section and the position specified by the user operation, determining which of the first and second detecting sections is used to detect a feature in an image generated by the image capturing section subsequent to that point in time.

2. The image capture device of claim 1, further comprising a display section for displaying the image that has been generated by the image capturing section and the position of the feature that has been detected by the first detecting section while the feature in the image is being detected by the first detecting section.

3. The image capture device of claim 1, wherein the first detecting section detects the feature in the generated image using a predefined pattern, and
    wherein the second detecting section detects the feature in the generated image by reference to the position specified for the interface section and color information of the generated image.

4. The image capture device of claim 3, wherein the first detecting section detects the feature in the generated image by using a pattern representing at least one of the shapes and relative arrangement of multiple parts that form a human face.

5. The image capture device of claim 2, wherein while the first detecting section locates the feature,
    the controller determines whether or not the position specified for the interface section is inside of an area from which the feature has been detected, and
    wherein if the position is inside of the feature detected area, the controller instructs the display section to display a recognizable indicator at the location of the feature detected.

6. The image capture device of claim 2, wherein while the first detecting section locates the feature,
the controller determines whether or not the position specified for the interface section is inside of an area from which the feature has been detected, and
wherein if the position is outside of the area, the controller determines that the feature in the image be detected by the second detecting section, instructs the second detecting section to detect the image feature by reference to the position and color information of the image, and instructs the display section to display a recognizable indicator at the location of the image feature detected by the second detecting section.

7. The image capture device of claim 5, wherein if the position that has been inside of the feature detected area is now outside of that area, the controller determines that the feature in the image be detected by the second detecting section, instructs the second detecting section to detect the image feature by reference to the position and color information of the image, and instructs the display section to display a recognizable indicator at the location of the image feature detected by the second detecting section.

8. The image capture device of claim 6, wherein if the position that has been outside of the feature detected area is now inside of that area, the controller instructs the display section to display a recognizable indicator at the location of the feature detected by the first detecting section.

9. The image capture device of claim 1, wherein at least two of the first detecting section, second detecting section, and the controller are integrated together on a single chip circuit.

10. The image capture device of claim 2, wherein the first detecting section detects the feature in the generated image using a predefined pattern, and
wherein the second detecting section detects the feature in the generated image by reference to the position specified for the interface section and color information of the generated image.

11. The image capture device of claim 1, wherein
the controller determines whether or not the position specified by the user operation is inside of an area from which the feature has been detected by the first detecting section and
wherein
if the position specified by the user operation is inside of the area, the controller determines that the feature in the image be detected by the first detecting section, and
if the position specified by the user operation is outside of the area, the controller determines that the feature in the image be detected by the second detecting section.

* * * * *